United States Patent
Lupher et al.

(10) Patent No.: US 9,036,035 B2
(45) Date of Patent: May 19, 2015

(54) RIFLE SCOPE WITH VIDEO OUTPUT STABILIZED RELATIVE TO A TARGET

(75) Inventors: John Hancock Lupher, Austin, TX (US); John Francis McHale, Austin, TX (US); Douglas Ainsworth Scott, Cedar Park, TX (US)

(73) Assignee: TrackingPoint, Inc., Pflugerville, TX (US)

( * ) Notice: Subject to any disclaimer, the term of this patent is extended or adjusted under 35 U.S.C. 154(b) by 0 days.

(21) Appl. No.: 13/460,817

(22) Filed: Apr. 30, 2012

(65) Prior Publication Data

US 2013/0286239 A1    Oct. 31, 2013

(51) Int. Cl.
| | |
|---|---|
| H04N 5/228 | (2006.01) |
| H04N 5/14 | (2006.01) |
| F41G 3/16 | (2006.01) |
| H04N 5/232 | (2006.01) |
| F41G 3/06 | (2006.01) |
| F41G 3/08 | (2006.01) |

(52) U.S. Cl.
CPC ..... H04N 5/145 (2013.01); F41G 3/06 (2013.01); F41G 3/08 (2013.01); F41G 3/165 (2013.01); H04N 5/23254 (2013.01); H04N 5/23277 (2013.01)

(58) Field of Classification Search
CPC ..... H04N 5/262; H04N 5/2621; H04N 5/272; H04N 5/23229
USPC ........ 348/208.99, 208.1, 208.2, 208.3, 208.4, 348/208.6
See application file for complete search history.

(56) References Cited

U.S. PATENT DOCUMENTS

| | | | |
|---|---|---|---|
| 5,974,940 A | 11/1999 | Madni et al. | |
| 7,746,382 B2* | 6/2010 | Soupliotis et al. | 348/208.99 |
| 8,074,394 B2 | 12/2011 | Lowrey, III | |
| 8,336,777 B1 | 12/2012 | Pantuso et al. | |
| 8,453,368 B2 | 6/2013 | Bockmon | |
| 2009/0315808 A1* | 12/2009 | Ishii | 345/1.3 |
| 2010/0128166 A1* | 5/2010 | Holmberg | 348/373 |
| 2010/0214425 A1* | 8/2010 | Huang et al. | 348/208.99 |
| 2010/0245604 A1* | 9/2010 | Ohmiya et al. | 348/208.99 |
| 2012/0132709 A1* | 5/2012 | Lowrey, III | 235/407 |
| 2013/0107066 A1* | 5/2013 | Venkatraman et al. | 348/208.4 |
| 2014/0110482 A1 | 4/2014 | Bay | |

OTHER PUBLICATIONS

Cretual, Armel; and Chaumette, Francois; "Dynamic Stabilization of a Pan and Tilt Camera for Submarine Image Visualization," Computer Vision and Image Understanding, vol. 79, pp. 47-65, Feb. 4, 2000.

(Continued)

*Primary Examiner* — Sinh Tran
*Assistant Examiner* — Zhenzhen Wu
(74) *Attorney, Agent, or Firm* — Cesari & Reed LLP; R. Michael Reed

(57) ABSTRACT

A rifle scope including a display, at least one optical sensor to capture video of a view area, and image processing circuitry coupled to the display and the at least one optical sensor. The image processing circuitry is configured to select visual elements within a sequence of frames of the video and to align the visual elements within adjacent frames of the sequence of frames to produce a video output corresponding to the view area that is stabilized relative to a target. The image processing circuit is configured to provide the video output to the display.

19 Claims, 6 Drawing Sheets

(56) References Cited

OTHER PUBLICATIONS

You, Suya; Neumann, Ulrich; and Azuma, Ronald; "Hybrid Inertial and Vision Tracking for Augmented Reality Registration," IEEE Proceedings on Virtual Reality, pp. 260-267 (Mar. 13, 1999-Mar. 17, 1999).

Cohen, Isaac; and Medioni, Gerard; "Detecting and Tracking Moving Objects for Video Surveillance," IEEE Computer Society Conference on Computer Vision and Pattern Recognition, Jun. 23-25, 1999 (Fort Collins, CO), vol. 2, pp. 1-7.

Shekarforoush, H.; and Chellappa, R.; "A Multi-Fractal Formalism for Stabilization, Object Detection and Tracking in FLIR Sequences", International Conference on Image Processing, Sep. 10-13, 2000, vol. 3, pp. 78-81.

Balakirsky, Stephen B.; and Chellappa, Rama; "Performance Characterization of Image Stabilization Algorithms", U.S. Army Technical Report—Government Grant No. DAAH04-93-G-0419, Apr. 1996, pp. 1-32.

Vermuelen, Eddy; "Real-Time Video Stabilization for Moving Platforms", 21st Bristol UAV Systems Conference, Apr. 2007, pp. 1-14.

Lipton, Alan J.; Fujiyoshi, Hironobu; and Patil, Raju S., "Moving Target Classification and Tracking from Real-Time Video", Fourth IEEE Workshop on Applications of Computer Vision, WACV '98, Oct. 19-21, 1998, pp. 8-14.

Yilmaz, Alper; Khurram, Shafique; Lobo, Niels; Li, Xin; Olson, Teresa; and Shah, Mubarak A.; "Target-Tracking in FLIR Imagery Using Mean-Shift and Global Motion Compensation," In IEEE Workshop on Computer Vision Beyond Visible Spectrum, pp. 54-58. Dec. 2001.

Yilmaz, Alper; Shafique, Khurram; and Shah, Mubarak; "Target Tracking in Airborne Forward Looking Infrared Imagery", Image and Vision Computing, vol. 21, pp. 623-635 (2003).

\* cited by examiner

US 9,036,035 B2

RIFLE SCOPE WITH VIDEO OUTPUT STABILIZED RELATIVE TO A TARGET

FIELD

The present disclosure is generally related to telescopic devices, and more particularly to telescopic devices including background stabilization.

BACKGROUND

In optical systems, jitter undermines image quality. For example, human movement is a common source of jitter in portable optical devices, such as handheld video cameras and telescopic devices (e.g., binoculars, rifle scopes, telescopes, and the like). Telescopic devices that are capable of high magnification of a viewing area also magnify the jitter. In certain applications, such as rifle scopes or optical spotting, such jitter can adversely impact image quality and/or accuracy. In an example involving rifle scopes, human jitter can introduce dramatic variations in terms of minutes of angle (MOA) with respect to close range targets, and can introduce even more dramatic variations with long range targets. For example, at a distance of 500 yards, variations of 2 to 15 minutes of angle can cause a shooter to miss his/her target by up to 75 inches or more. One MOA can cause the shooter to miss a target by 15 inches at 1500 yards.

To reduce the effect of jitter, some optical devices include support structures that operate to dampen such jitter. In other instances, mechanical transducers and structures are introduced to actively stabilize the optical device and/or the associated support structure (such as a rifle). While such active stabilization components may reduce jitter, they can reduce the portability of the optical device in terms of both increased weight and increased power consumption.

SUMMARY

In an embodiment, a gun scope includes a display, at least one optical sensor to capture video of a view area, and image processing circuitry coupled to the display and the at least one optical sensor. The image processing circuitry is configured to select visual elements within a sequence of frames of the video and to align the visual elements within adjacent frames of the sequence of frames to produce a video output corresponding to the view area that is stabilized relative to a target. The image processing circuit is configured to provide the video output to the display.

In another embodiment, a binocular display device includes a pair of eyepieces, a display that is optically accessible through the pair of eyepieces, and at least one optical element to capture video of a view area. The binocular display device further includes image processing circuitry coupled to the display and the at least one optical element. The image processing circuitry is configured to align visual elements within sequential frames of the video to produce a video output that is stabilized relative to a target and to provide the video output to the display.

In still another embodiment, a method includes receiving a video stream including a sequence of frames at a circuit of a gun scope. The method further includes aligning visual elements within adjacent frames of the sequence of frames using the circuit to produce a video output that is stabilized relative to a target and providing the video output to a display of the gun scope.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of a portable telescopic device, such as a telescope, binoculars, or a gun scope, are described below that are configured to process optical data from a view area of the telescopic device, in real-time. In an example, the portable telescopic device is configured to stabilize the background relative to a target by aligning optical elements within adjacent frames of a sequence of frames of a video of the view area. An example of a telescopic device that includes circuitry configured to provide background stabilization is described below with respect to FIG. 1.

Figure 1:
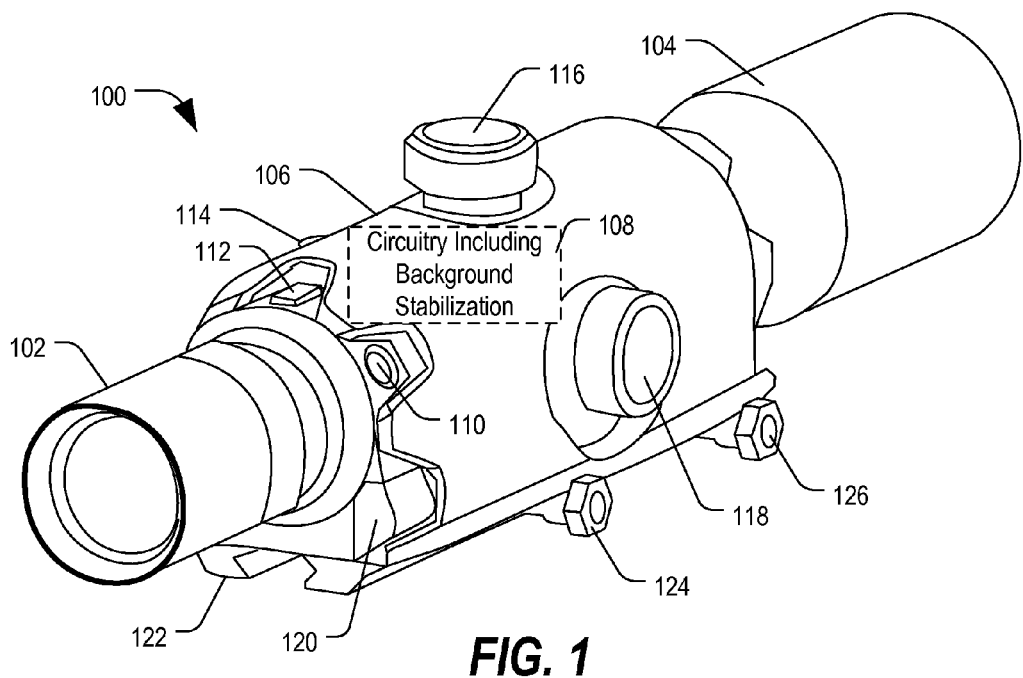
FIG. 1 is a perspective view of an embodiment of a telescopic device having circuitry configured to provide background stabilization.

FIG. 1 is a perspective view of an embodiment of a telescopic device 100 having circuitry 108 configured to provide background stabilization. Telescopic device 100 includes an eyepiece 102 and an optical element 104 coupled to a housing 106. Housing 106 defines an enclosure sized to receive circuitry 108. Optical element 104 includes an objective lens and other components configured to receive light and to direct and focus the light toward optical sensors associated with circuitry 108.

Telescopic device 100 includes user-selectable buttons 110 and 112 on the outside of housing 106 that allow the user to interact with circuitry 108 to select between operating modes, to adjust settings, and so on. In some instances, the user may interact with at least one of the user-selectable buttons 110 and 112 to select a target within the view area. Further, telescopic device 100 includes thumbscrews 114, 116, and 118, which allow for manual adjustment of the telescopic device 100. In an example, thumbscrews 114, 116 and 118 can be turned, individually, to adjust the crosshairs within a view area of telescopic device 100. In some instances, thumbscrews 114, 116, and 118 can be omitted, and one or more user selectable buttons may be provided on a device or component coupled to the telescopic device 100 to allow the user to interact with circuitry 108 to adjust the crosshairs and/or to select a target.

Housing 106 includes a removable battery cover 120, which secures a battery within housing 106 for supplying power to circuitry 108. Housing 106 is coupled to a mounting structure 122, which is configured to mount to a surface of a portable structure and which includes fasteners 124 and 126 that can be tightened to secure the housing to the portable structure, such as a tripod, a rifle, an air gun, or another structure. In some instances, mounting structure 122 may be omitted.

In an example, circuitry 108 includes optical sensors configured to capture video associated with a view area of telescopic device 100 received through optical element 104. The video includes a sequence of still images or video frames, which represent snapshots of the view area taken in rapid succession over time and which, when presented to the user appear as a seamless video. Each image can be referred to as a frame, and the rate at which frames of the sequence are captured and provided to a display within telescopic device 100 can vary. Circuitry 108 further includes logic circuitry (such as a digital signal processor (DSP), a micro processor unit (MCU), and/or a field programmable gate array (FPGA)) configured to process the video to detect and stabilize the background from frame to frame by aligning stationary portions of adjacent frames to stabilize the video relative to a target to remove jitter.

In an example, a user may attach telescopic device 100 to his/her rifle to produce a firearm system and may carry the firearm system into the field during a hunting expedition. When the user looks through the telescopic device 100 toward a view area, circuitry 108 operates to reduce or eliminate jitter relative to a target so that the displayed version of the view area is presented as being stable, despite jitter due to human movement.

In another example, the user may utilize telescopic device 100 to view a distant view area, with or without a supporting structure. Circuitry 108 within telescopic device 100 stabilizes the video of the view area relative to a target by aligning optical elements within adjacent frames within a sequence of frames, and then presents the adjusted video to a display as stabilized video. In some instances, the user may interact with buttons 112 and/or 114 to select a target within the view area, and circuitry 108 can be configured to process optical content within the sequence of frames to identify a target object relative to the background and to track the target object as it moves within the view area.

At high magnification, very small movements, such as normal jitter, are magnified by the optics within telescopic device 100, making such movements very noticeable, and in some instances, even disorienting. However, circuitry 108 operates to reduce the effects of such jitter by aligning optical elements in adjacent frames relative to a target to reduce or eliminate the visual impact of such jitter. Further, it should be appreciated that the optical sensors capture a wider view area than that shown at any magnification, making it possible to align adjacent frames, even in response to relatively large jitter, such as that caused by mechanical motion of a vehicle, for example.

Figure 2:
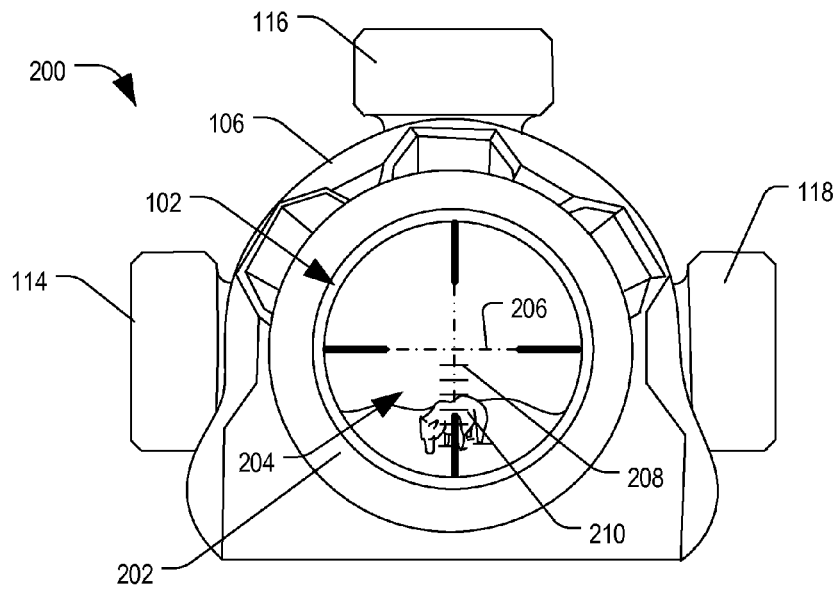
FIG. 2 is front view into the telescopic device of FIG. 1 depicting a view area including a reticle and a potential target.

FIG. 2 is front view 200 into the telescopic device 100 of FIG. 1 depicting a view area 204 including lines 206 and 208 forming a reticle and including a potential target 210. Front view 200 includes thumb screws 114, 116, and 118 and includes housing 106. In some instances, thumb screws 114, 116, and 118 can be omitted. Front view 200 further includes eyepiece 102 including an adjustable focusing element 202 that is part of the eyepiece 102.

View area 204 can be captured by optical sensors associated with circuitry 108 within housing 106 and converted into video data for stabilization prior to presenting the video data to a display within telescopic device 100. Circuitry 108 may also include a memory configured to store instructions that, when executed, cause processing circuitry of circuit 108 to process frames of the video data to provide image stabilization relative to a target.

While the above-description of FIGS. 1 and 2 have described circuitry within telescopic device 100 that provides background stabilization, it should be understood that such image stabilization can be implemented in hardware and/or in software executable by a processor. Without such stabilization, jitter can disturb the visual image, particularly at high magnification. An example of a view from a prior art telescopic device without stabilization is described below with respect to FIG. 3.

Figure 3:
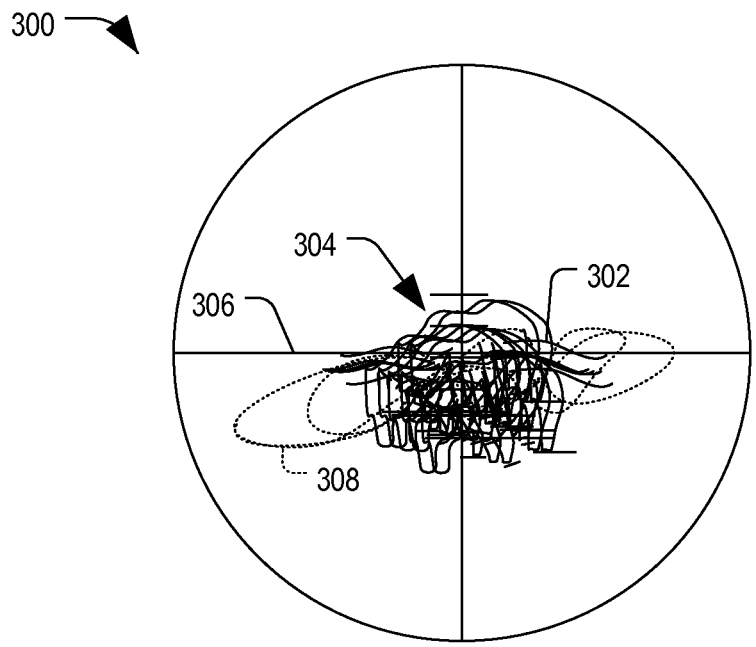
FIG. 3 is a representative example of a view area of a conventional telescopic device without background stabilization and including an overlay of a dashed line representing movement of the center of the telescope in response to jitter.

FIG. 3 is a representative example of a view area 300 of a conventional telescopic device without background stabilization and including an overlay 308 of a dashed line representing movement of the center of the telescopic device in response to jitter. View area 300 includes a reticle 306, which is stable relative to the view area. The reticle 306 may be contained within or produced by the conventional telescopic device. In this instance, the jitter renders the background 302 and the target object 304 blurry and can render the telescopic device unusable to achieve a desired result, i.e., hitting a desired target in the context of a gun scope or viewing a distant object in detail. Further, the jitter causes the relative angle of the telescopic device (as determined from the longitudinal axis of the telescopic device) to vary relative to the target object 304, as depicted by dashed line 308. In extreme cases and particularly extreme cases when the telescopic device is configured to provide high magnification, such jitter may cause the view area to shift dramatically, causing a potential target to move in and out of the view area.

In telescopic devices, such jitter is undesirable, and extended viewing can cause the viewer to experience motion sickness. In gun scopes, spotting scopes, and the like, such jitter can cause the user to miss his/her target. An example of the view area of the telescopic device 100 of FIGS. 1 and 2, stabilized relative to a target to overcome or reduce jitter, is described below with respect to FIG. 4.

Figure 4:
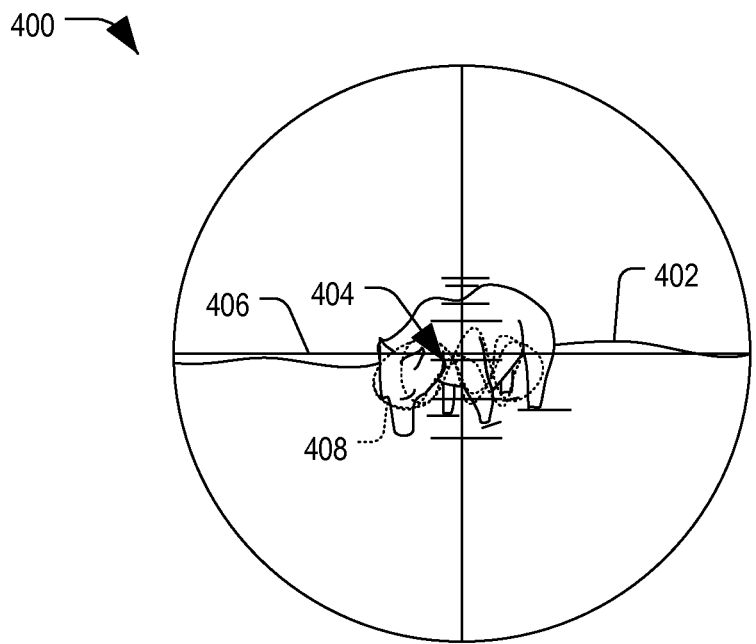
FIG. 4 is an exemplary view of the view area of the telescopic device of FIGS. 1 and 2 depicting a stabilized background and including an overlay depicting digitally stabilized movement of the center of the telescope.

FIG. 4 is an exemplary view of the view area 400 of the telescopic device 100 of FIGS. 1 and 2 depicting a stabilized background 402 and target object 404 and including an overlay (reticle 406). Dashed line 408 represents dampened movement of the center of the telescopic device 100 relative to the target object 404 in response to jitter. In this example, circuitry 108 stabilizes the background relative to target object 404 by aligning optical elements within adjacent frames of a sequence of video frames to remove/reduce jitter. As jitter causes telescopic device 100 to change its orientation, circuitry 108 selects optical elements within the view area of adjacent frames and adjusts the frames to align the optical elements, stabilizing the view area 400 relative to target object 404, which may be moving within the view area. As a result, the user's aim can be enhanced, allowing the user to more accurately track the target object 404 using the telescopic device 100.

In an example, the actual view area of the telescopic device 100 is larger than the displayed view area. Circuitry 108 displays only a magnified portion (view area 400) of the entire area captured by optical sensors of the telescopic device.

Circuitry 108 stabilizes the view area 400 by aligning optical elements within adjacent frames in the video frame sequence relative to target object 404. In particular, circuitry 108 identifies optical or visual elements within a first frame, identifies corresponding visual elements within a next frame, and aligns the visual elements (frame-by-frame) to produce an adjusted sequence of frames, representing a stabilized video of view area 400. In some instances, movement of telescopic device 100 may be intentional, such as to view a different area or to track a target. Circuitry 108 can utilize gyroscopic sensors, inclinometers, accelerometers, and other sensors to determine when a directional change of telescopic device 100 exceeds a pre-determined threshold. When the directional change is less than the pre-determined threshold, circuitry 108 aligns the visual elements as discussed above. However, when the directional change exceeds the pre-determined threshold, circuitry 108 determines a movement (motion) vector characterizing a rate of change and direction of movement of telescopic device 100, and selectively aligns corresponding visual elements from frame to frame in response to determining the motion vector. In one instance, circuitry 108 aligns corresponding visual elements to the motion vector to stitch adjacent view areas together and to smooth the visual images. For example, visual elements of a first frame may exist in a different position within the next frame as the user changes the orientation of telescopic device 100, and circuitry 108 aligns the adjacent frames to the movement vector to provide smoother transitions as the telescopic device 100 is repositioned.

In a particular example, circuitry 108 aligns adjacent frames by identifying visual elements within a first frame, compressing the frame through one or more compression operations, identifying visual elements within a next frame in the frame sequence, compressing the next frame through the one or more compression operations, comparing the locations of the visual elements within the frames, and adjusting the frames to align the visual elements of the adjacent frames within the sequence of frames in their compressed state. Once aligned, the frames can be expanded (decompressed) and shifted (adjusted) pixel-wise to align the visual elements, frame-by-frame, through one or more iterations to produce an adjusted video that is stabilized relative to target 404.

While the above-example has focused on a telescopic device, circuitry 108 may also be incorporated within other types of optical devices. An example of a binocular display device including circuitry 108 is described below with respect to FIG. 5.

Figure 5:
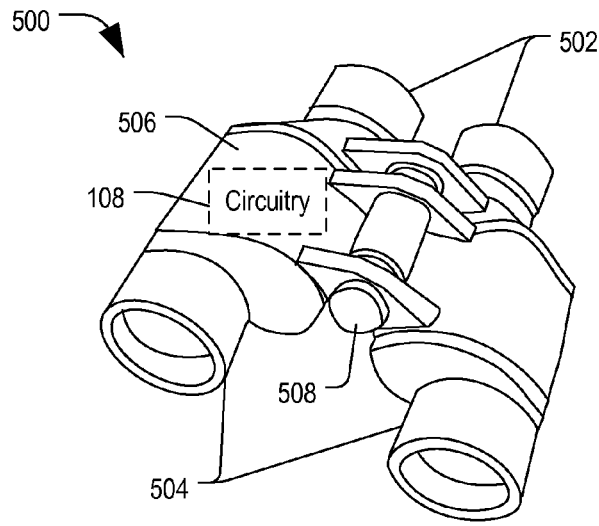
FIG. 5 is a perspective view of a binocular display device having circuitry configured to provide background stabilization, such as the circuitry of FIG. 1.

FIG. 5 is a perspective view of a binocular display device 500 having circuitry 108 configured to provide background stabilization. In this instance, binocular display device 500 includes eyepieces 502 and optical elements 504 coupled through a housing 506 that may include one or more prismatic components as well as circuitry 108. Housing 506 also includes a display coupled to circuitry 108 for presenting the stabilized video. Binocular display device 500 further includes a binocular adjustment mechanism 508 allowing for physical adjustment of the eyepieces 502 to fit the user.

In this example, circuitry 108 is configured to capture video associated with a view area that is observed through at least one of the optical elements 504. Circuitry 108 aligns visual elements within a frame to corresponding visual elements within a previous frame, frame-by-frame, stabilizing visual elements relative to an optical target within the sequence of frames. In some instances, circuitry 108 compresses the frames and then determines an adjustment to align the visual elements within the compressed frame. The adjustment is then applied and refined at each compression level until the original frame is aligned to the previous frame, producing adjusted (aligned) frames that represent a stabilized video of the view area that is adjusted to reduce or eliminate jitter.

It should be understood that the adjustment at each level of compression represents a shift of a number of pixels. At each level of compression, the pixel adjustment is increasingly course, so the pixel shift information that is determined at a high level of compression can be adjusted at each lower level of compression until the actual uncompressed image is adjusted. In an example, at a first highest level of compression, the image may be shifted by 100 pixels, at the next level of compression, the number of pixels may be adjusted to 110 or 90, for example, and at the original image resolution, the pixel shift may end up being 112 or 96 or some other number of pixels. However, at each compression level, the granularity of the adjustment is more refined.

Circuitry 108 determines global motion parameters associated with the telescopic device 100 using gyroscopic sensors, accelerometers, inclinometers, and other sensor data. Such data can be used to differentiate jitter from intentional movement of the optical device (such as intentional movement of the optical device to capture a different view area). Sensing such movement, telescopic device 100 can offset changes in the view area (as discussed above by aligning visual elements from frame-to-frame) to stabilize the image relative to a target until the sensed movement exceeds a pre-determined threshold. When the sensed movement exceeds the pre-determined threshold, circuitry 108 can selectively align visual elements from frame to frame to smooth the user's movement as the telescopic device 100 is repositioned. For example, a stone or tree that is in the left-most portion of the view area may be used to align an adjacent frame, shifting the view area to present the same stone or tree shifted toward the middle of the view area along the motion vector. In general, the optical sensors capture pictures from a wider area than the view area that is displayed, making it possible to selectively shift the view area to provide the stabilized image. Using the global motion parameters, circuitry 108 uses selected pixels from the wider range of pixels to align frames along a motion vector, providing a stable view that appears relatively immune to jitter as the user adjusts the view of telescopic device 100.

Displacement of one frame to the next is defined by a horizontal translation, a vertical translation, and a rotation component, which can be understood in terms of a motion vector. As previously mentioned, sensors (such as gyroscopic sensors, inclinometers, accelerometers, and other sensors) are provided that can detect global motion parameters. Using the global motion data, circuitry 108 can detect global movement of telescopic device 100, selectively stabilizing the moving background of the view area relative to a target and without filtering local motion, which may be attributable to movement of the target within the view area.

Once global motion is accounted for, the remaining motion within the view area is relatively small and can be used to determine correction factors from frame-to-frame. After a few frames, circuitry 108 can adjust selected visual elements to select stationary elements, zeroing-out remaining motion parameter errors under the assumption that most of the pixels of the selected visual elements have the same translation and rotation, which is generally true for background objects. However, in the presence of high winds or other environmental conditions, certain background objects (such as trees) may exhibit localized movement that can impact background stabilization if moving portions of those background objects are selected as visual elements for use in aligning adjacent frames.

In one possible example, circuitry 108 automatically selects visual elements within a view area, such as visual elements having detectable differences relative to surrounding elements of the frame. Such detectable differences may be determined based on color, texture, heat, or other detectable parameters, high contrast, or other optical features. Circuitry 108 then compresses a frame representing a display of the view area data through one or more compression operations. Circuitry 108 determines global motion parameters. If the global motion parameters exceed a pre-determined motion threshold, circuitry 108 displays the new view area. Otherwise, circuitry 108 compares the compressed view area data with that of a previous frame and aligns the visual elements relative to a target within the compressed frames. Circuitry 108 then applies the adjustment and refines it at each level of compression until the adjusted frame is aligned to the previous frame, thereby providing image stabilization relative to the target from frame to frame within a sequence of frames.

In general, selection of visual elements may be performed automatically. In an example, circuitry 108 selects visual elements having relatively high contrast relative to surrounding pixels. In the context of an infrared scope, initial visual element selection may be based on thermodynamic contrasts. For example, circuitry 108 can detect visual elements having a relatively high thermal contrast relative to other objects.

In some instances, such visual elements may represent targets within the view area. For example, again in the context of an infrared telescopic device, hot targets that appear as a cluster of relatively bright pixels within the view area can have high contrast relative to neighboring pixels. In this instance, cooler background visual elements may be selected for background stabilization, while foreground or high thermal contrast objects may be initially identified as targets and therefore not utilized for background stabilization.

In a telescopic device that does not include infrared imaging, circuitry 108 automatically selects optical elements for background stabilization. For such automatic selection, the relative position of background visual elements within a view area should be relatively static, while targets may move relative to the background visual elements. Over time, circuitry 108 can refine selection of background visual elements as a function of relative movement, discontinuing use of previously selected background visual elements for alignment purposes when such elements exhibit localized movement. In the instance of a tree blowing in the wind, portions of the tree may be relatively stable, while other portions may move. In this instance, circuitry 108 may select relatively stable portions of a visual element (such as a portion of the trunk of the tree that does not move) for use in frame alignment operations.

Figure 6:
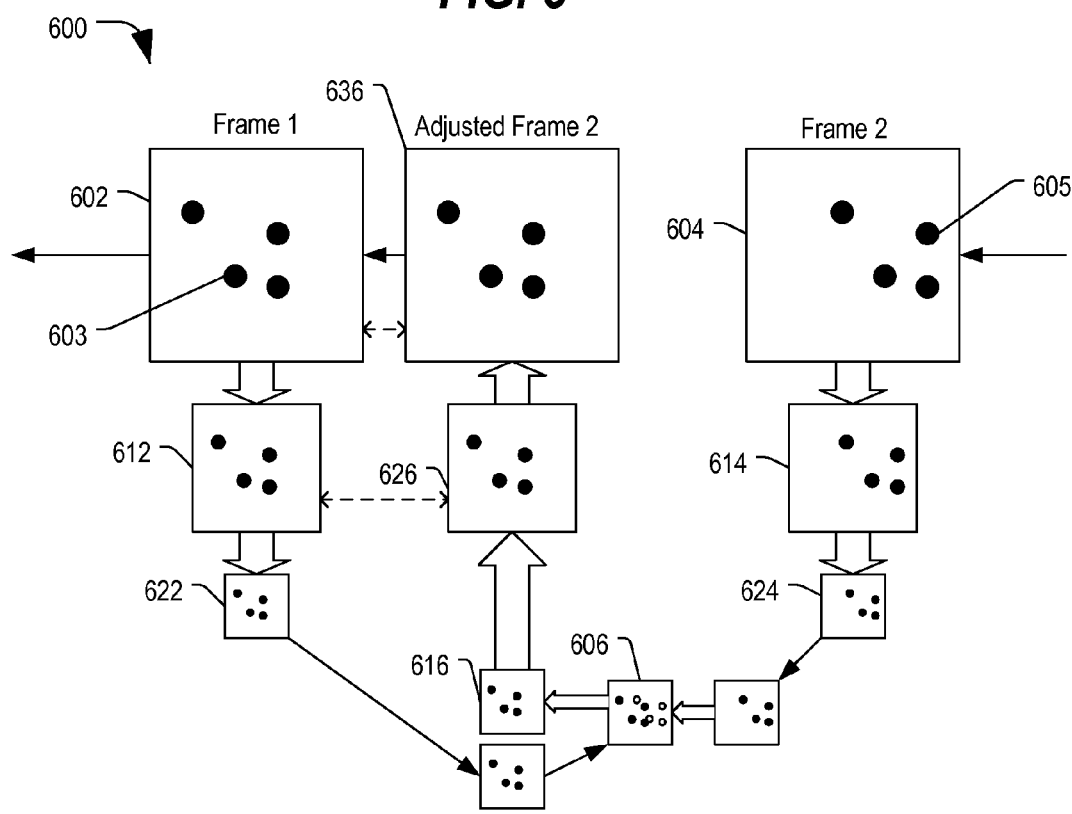
FIG. 6 is a block diagram of a method of aligning adjacent frames of a video stream to reduce or eliminate jitter.

FIG. 6 is a block diagram of a method 600 of aligning adjacent frames of a video stream to reduce or eliminate jitter. In FIG. 6, circuitry 108 receives a sequence of video frames, such as frames 602 and 604. Frames 602 and 604 are first and second frames in a sequence. Circuitry 108 identifies visual elements 603 within frame 602. Circuitry 108 compresses frame 602 through a first compression operation to produce a compressed frame 612 having compressed visual elements. Circuitry 108 further compresses frame 612 through one or more second compression operations to produce compressed frame 622 having compressed visual elements. Circuitry 108 receives a second frame 604 including visual elements 605, which are shifted relative to optical elements 603 in previous frame 602. Circuitry 108 compresses the second frame 604 through a compression operation to produce a compressed frame 614 having compressed visual elements. Circuitry 108 further compresses the compressed frame 614 through one or more compression operations to produce compressed frame 624.

As depicted by frame 606, visual elements 603 and 605 (in their compressed frames 622 and 624) are not aligned. Circuitry 108 shifts frame 624 to align compressed visual elements to compressed visual elements of compressed frame 622, producing adjusted frame 616, to determine shift information, such as the number of pixels in X and Y directions that the frame 624 would need to be adjusted in order to align the compressed visual elements. Circuitry 108 uses the shift information and refines it by aligning the visual elements within frame 616 to those within compressed frame 612 to determine refined shift information, and further refines that information to align the visual elements within frame 626 with those of frame 602. Thus, circuitry 108 produces an adjusted frame 636, which can be presented to a display device as a second frame in a sequence of frames, providing frame-to-frame video stabilization.

In the example of FIG. 6, circuitry 108 compresses the frame twice and then performs the alignment with the compressed frames to determine a number of pixels to shift the image, and then adjusts the alignment information at each of the compression levels to refine the alignment information. While the above-discussion assumed two levels of compression, it should be appreciated that multiple compression/alignment operations may be performed to provide a desired level of granularity with respect to the image alignment as part of the video stabilization process. In an example, each level of compression provides a higher granularity in terms of image alignment, pixel-wise, allowing the received frame to be aligned to the previously received frame to a desired level of granularity. The alignment information can be adjusted at each compression level to enhance or refine alignment precision.

In general, circuitry 108 performs background stabilization by aligning visual elements of adjacent frames relative to a target. Such alignment can be performed with or without compression. It should be appreciated that circuitry 108 can be incorporated into various telescopic devices. Further, circuitry 108 may vary from implementation to implementation, depending on the type of telescopic device. One possible example of a system including circuitry 108 is described below with respect to FIG. 7.

Figure 7:
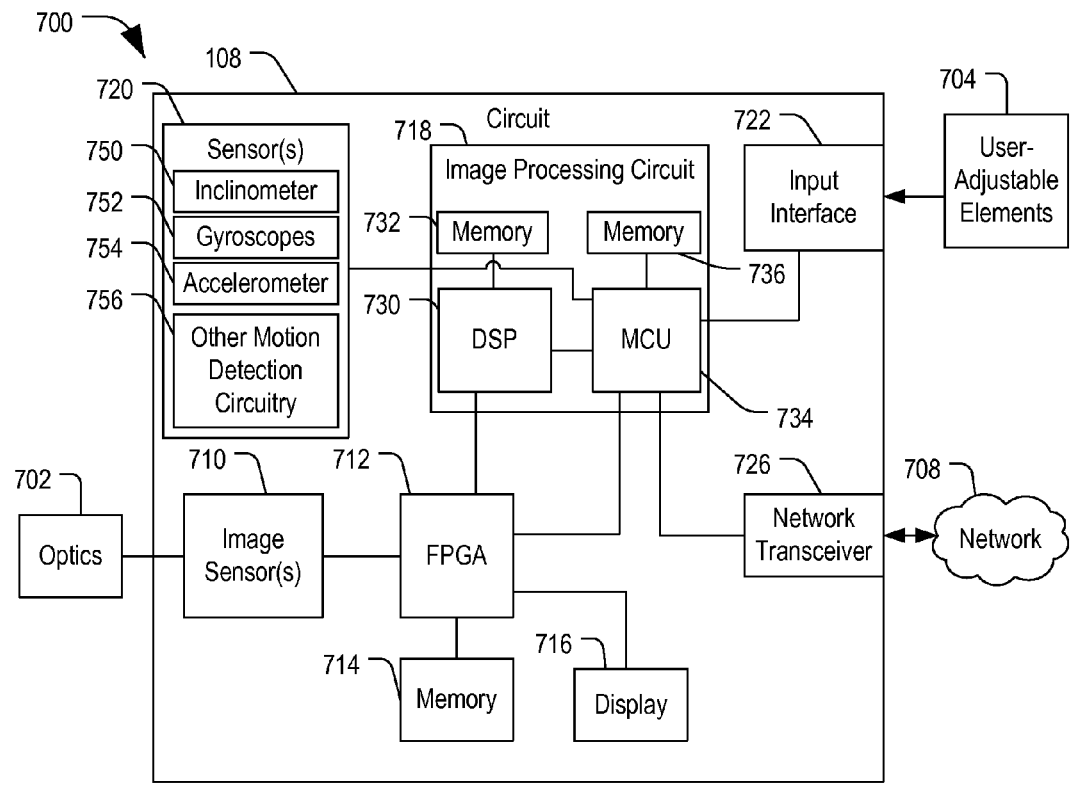
FIG. 7 is a block diagram of a system including the circuitry of FIGS. 1, 2 and 5.

FIG. 7 is a block diagram of a system 700 including the circuitry 108 of FIGS. 1, 2, 4, and 5. System 700 includes optical elements 702 configured to direct (and focus) light toward image (optical) sensors 710 of circuitry 108. System 700 further includes user-selectable elements 704 (such as buttons 110 and 112 and/or thumb screws 114, 116, and 118 in FIG. 1) coupled to an input interface 722 of circuitry 108 to allow the user to interact with circuitry 108, for example, to select options and/or to make adjustments.

Circuitry 108 includes a field programmable gate array (FPGA) 712 including one or more inputs coupled to outputs of image (optical) sensors 710. FPGA 712 further includes an input/output interface coupled to a memory 714, which stores data and instructions. FPGA 712 includes a first output coupled to a display 716 for displaying video and/or text. FPGA 712 is also coupled to a digital signal processor (DSP) 730 and a micro-controller unit (MCU) 734 of an image processing circuit 718. DSP 730 is coupled to a memory 732 and to MCU 734. MCU 734 is coupled to a memory 736. Memories 714, 732, and 736 are computer-readable and/or processor-readable data storage media capable of storing instructions that are executable (by FPGA 712, DSP 730, and/or MCU 734) to perform various operations.

Circuitry 108 also includes sensors 720 configured to measure one or more environmental parameters (such as wind speed and direction, humidity, temperature, and other environmental parameters), to measure motion of the telescopic device, and/or to measure optical elements, such as reflected laser range finding data, and to provide the measurement data to MCU 734. In one example, sensors 720 include inclinometers 750, gyroscopes 752, accelerometers 754, and other motion detection circuitry 756.

FPGA 712 is configured to process image data from image (optical) sensors 710. FPGA 712 processes the image data to stabilize the video by aligning optical elements with adjacent frames relative to a target. Further FPGA 712 enhances image quality through digital focusing and gain control. In some instances, FPGA 712 performs image registration and cooperates with DSP 730 to perform visual target tracking FPGA 712 further cooperates with MCU 734 to mix the video data with reticle information and provides the resulting video data to display 716.

While the example of FIG. 7 depicted some components of circuitry 108, at least some of the operations of circuitry 108 may be controlled using programmable instructions. MCU 734 is coupled to input interface 722 and network transceiver 726. In an example, circuitry 108 can include an additional transceiver, which can be part of an input interface 722, such as a Universal Serial Bus (USB) interface or another wired interface for communicating data to and receiving data from a peripheral circuit. In an example, MCU 734, DSP 730, and FPGA 712 may execute instructions stored in memories 736, 732, and 714, respectively. Network transceiver 726 and/or input interface 722 can be used to update such instructions. For example, the user may couple system 700 to a computing device through network 708 or to a computing device or portable memory device (such as through a USB connection) to download updated instructions, such as new versions of background stabilization instructions, which can be stored in one or more of the memories 714, 732, and 736 to upgrade system 700. In one instance, the replacement instructions may be downloaded to a portable storage device, such as a thumb drive, which may then be coupled to circuitry 108. The user may then select and execute the upgrade instructions by interacting with the user-selectable elements 704. An example of portions of circuitry 108 including an expanded view of memories 714, 732, and 736 showing instructions executable by FPGA 710, DSP 730, and MCU 734, respectively, is described below with respect to FIG. 8.

Figure 8:
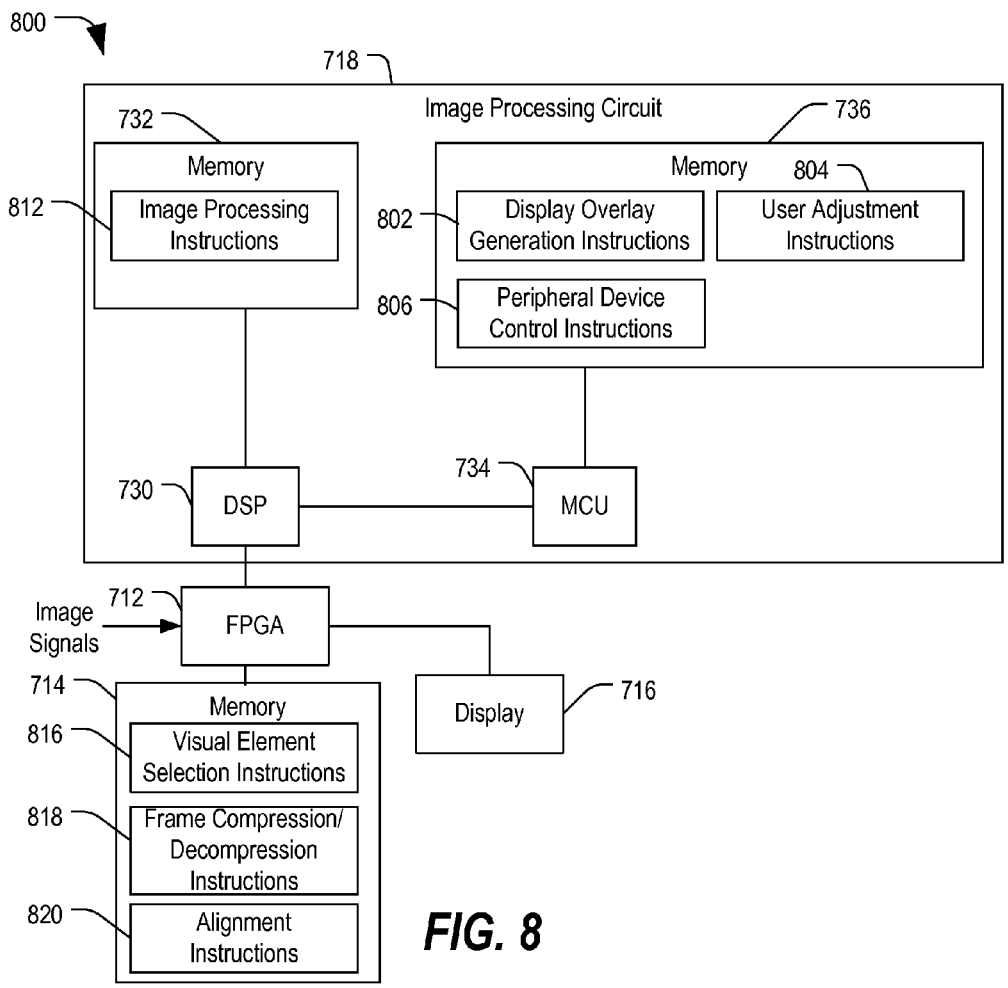
FIG. 8 is an expanded block diagram of a portion of the circuitry of FIGS. 1, 2, 5 and 6.

FIG. 8 is an expanded block diagram of a portion 800 of the circuitry 108 of FIGS. 1, 2, and 4-6. Portion 800 includes image processing circuit 718, FPGA 712, memory 714, and display 716. Image processing circuit 718 includes memories 732 and 736. In this example, memory 736 stores instructions that, when executed by MCU 734, cause MCU 734 to perform operations to control operation of circuitry 108 and of peripheral circuitry. Memory 736 includes display overlay generation instructions 802 that, when executed, cause MCU 734 to generate a visual reticle and/or other data that can be provided to display 716 in conjunction with video data. Memory 736 includes user adjustment instructions 804 that, when executed, cause MCU 734 to process inputs received from input interface 722 responsive to adjustments made by a user through user-selectable elements 704. Memory 736 includes peripheral device control instructions 806 that, when executed, cause MCU 734 to control peripheral circuitry (not shown). In an example, such peripheral circuitry can include an external display, a memory device, or other circuitry.

Memory 732 includes image processing instructions 812 that, when executed by DSP 730, cause DSP 730 to perform target tracking with respect to identified objects within a view area. DSP 730 may also be configured, through such instructions, to smooth and/or refine image data. Memory 732 may also include other digital signal processing instructions (not shown).

FPGA 712 is configured to process image/optical data. In particular FPGA 712 executes instructions in memory 714 to stabilize video data using global motion data from sensors 720. For example, using rate of change and other data from inclinometers 750, gyroscopes 752, accelerometers 754, and other motion detection circuitry 756, FPGA 712 can determine global motion data associated with the movement of the optical device and can compensate for jitter based on the global motion data to assist in stabilizing the video. Further, memory 714 includes visual element selection instructions 816, frame compression/decompression instructions 818, and alignment instructions 820 that, when executed, cause FPGA 712 to select visual elements within a frame, compress the frame, compare the optical elements within the compressed frame to optical elements of a previous frame, and align the optical elements of the compressed frame to those of the previous frame. The instructions also cause FPGA 712 to decompress the frame, aligning the optical elements in conjunction with the decompression operations to produce an adjusted frame sequence that is aligned frame-to-frame relative to a target within the view area to reduce jitter.

Figure 9:
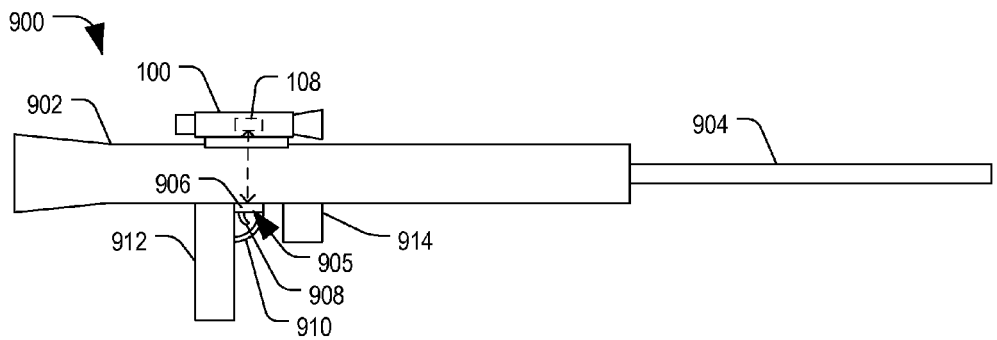
FIG. 9 is a side view of an example of a small arms firearm including the telescopic device of FIG. 1 implemented as a gun scope.

FIG. 9 is a side view of an example of a small arms firearm 900 including the telescopic device 100 of FIG. 1. In this example, telescopic device 100 is implemented as a rifle scope. As previously discussed, telescopic device 100 includes circuitry configured to provide background stabilization relative to a target. Telescopic device 100 is mounted to a rifle 902 including a muzzle 904. Telescopic device 100 is aligned with muzzle 904 to capture a view area in a line of fire of rifle 902. Rifle 902 includes a trigger assembly 906 including a peripheral circuit 905, which may include sensors and actuators for monitoring and controlling discharge of the firearm 900. Rifle 902 further includes a trigger shoe 908 to which a user may apply a force to discharge rifle 902. Rifle 902 further includes a trigger guard 910 and a grip 912 as well as a magazine 914. In this example, circuitry 108 within telescopic device 100 stabilizes a display of the view area to assist the user in directing the projectile from the firearm 900 toward a selected target.

In the illustrated example, circuitry 108 provides image stabilization to provide a stabilized view area that is stabilized relative to a target. At any magnification, the image stabilization assists the user to aim the optical device at the target and to maintain/track a target within the view area. Further, circuitry 108 can include logic configured to determine alignment of rifle 902 relative to a selected target. Circuitry 108 can also predict alignment of the rifle 902 to the selected target and can operate to prevent discharge until the rifle 902 is aligned to the target within an acceptable margin of error.

While the example in FIG. 9 depicts a rifle scope, it should be appreciated that the rifle scope implementation of the telescopic device 100 can be mounted onto different devices. As used herein, the term "rifle scope" refers to a telescopic device mounted to a structure designed to be hand-held and to be manually aimed at a target, such as a small arms firearm, rifle, air gun, or other portable firearm. Regardless of the type of firearm to which it is attached, telescopic device 100 may be referred to as a gun scope, which can be mounted to a variety of firearms, including rifles, handguns, air guns, other types of guns, or other types of devices.

The above-examples have depicted telescopic devices and view areas that can be processed to align visual elements to stabilize a view area relative to a target. One possible example of a method of providing background/view area stabilization is described below with respect to FIG. 10.

Figure 10:
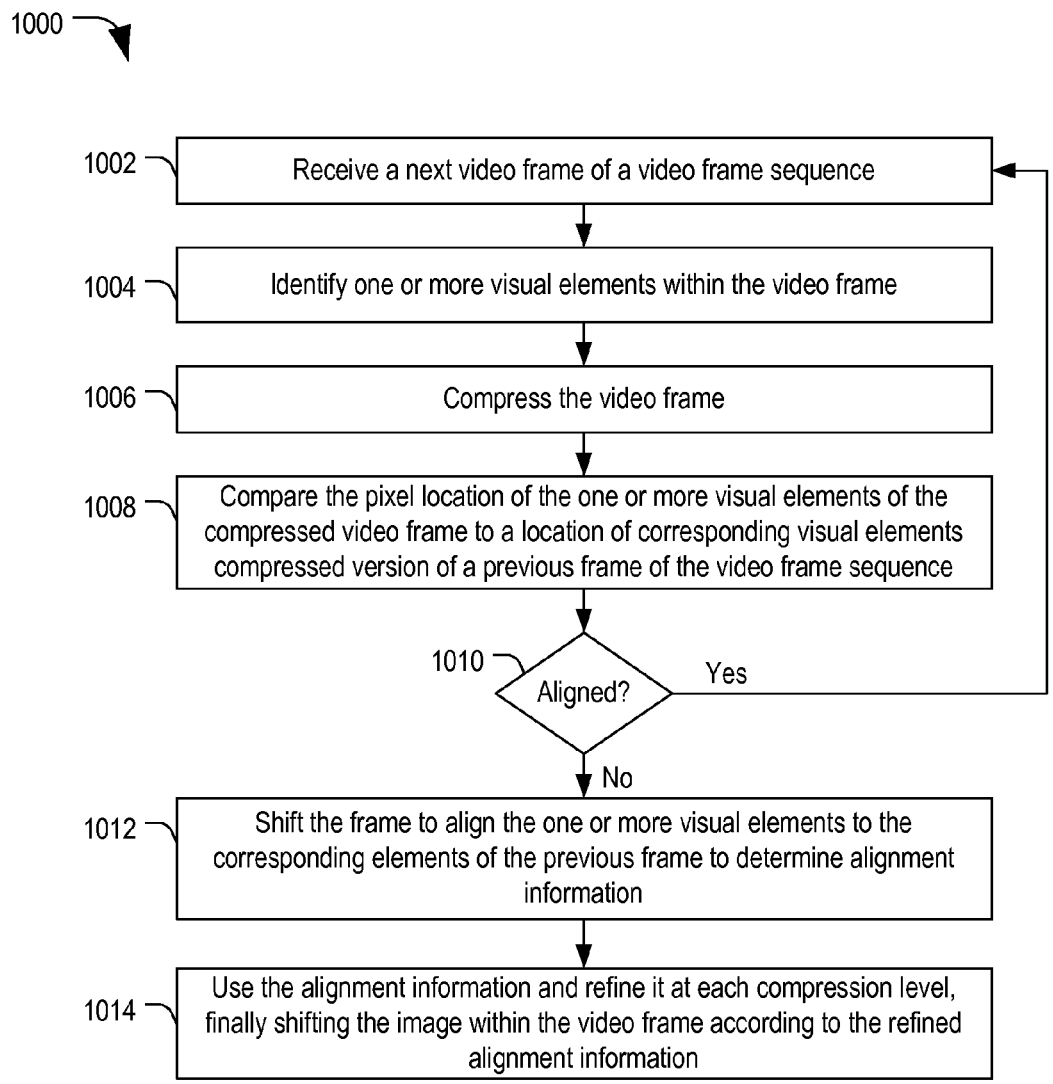
FIG. 10 is a flow diagram of an embodiment of a method of stabilizing video of a view area of a portable telescopic device.

FIG. 10 is a flow diagram of an embodiment of a method 1000 of stabilizing video of a view area of a portable optical device. Method 1000 uses image compression as part of the alignment process; however, as mentioned above, in some instances, circuitry 108 may align adjacent frames in a sequence of frames without such compression.

In method 1000, circuitry 108 receives a video stream including a plurality of video frames. At 1002, circuitry 108 receives a next video frame of the video frame sequence. Advancing to 1004, circuitry 108 identifies one or more visual elements within the video frame. Continuing to 1006, circuitry 108 compresses the video frame. Circuitry 108 may iteratively compress the video frame to a pre-determined compression level.

Proceeding to 1008, circuitry 108 compares the pixel location of one or more visual elements of the compressed video frame to a location of corresponding visual elements of the compressed version of a previous frame of the video frame sequence. Moving to 1010, circuitry 108 determines if the one or more visual elements of the compressed video frame are aligned with the corresponding visual elements of the previous frame (compressed by circuitry 108 to the same level of compression). If the visual elements are aligned at 1010, the method 1000 returns to 1002 and circuitry 108 receives a next video frame of the video frame sequence.

Returning to 1010, if the one or more visual elements are not aligned, the method 1000 advances to 1012 and circuitry 108 shifts the frame to align the one or more visual elements to the corresponding elements of the previous frame to determine alignment information. In an example, the alignment information includes a number of pixels to shift to align the one or more visual elements in the adjacent frames. Proceeding to 1014, circuitry 108 uses the alignment information and refines it at each compression level, finally shifting the image according to the refined alignment information to produce an adjusted frame. In this instance, the locations of the visual elements within the second frame are aligned to corresponding locations of the visual elements in the previous frame, thereby reducing jitter and stabilizing the video relative to the target.

In a particular example, the method includes receiving a video stream including a sequence of frames having a first frame and a second frame, compressing the first frame through one or more compression operations to produce a compressed first frame, and compressing the second frame through the one or more compression operations to produce a compressed second frame. The method also includes aligning visual elements within the compressed second frame to corresponding visual elements within the compressed first frame to produce alignment information, applying and refining the alignment information to produce the adjusted second frame, and providing a stabilized video stream including the first frame and the adjusted second frame to a display of a telescopic device. The resulting video stream is stabilized relative to the target. In one example, before aligning the visual elements, the method includes automatically identifying groups of pixels within the first and second frames having high contrast relative to surrounding pixels and automatically selecting the groups of pixels as the visual elements. In some instances, the method also includes receiving a user input corresponding to an area within the video stream and assigning one of the visual elements to the area corresponding to the user input. Circuitry 108 can automatically identify a potential target within the video stream based on movement of one of the visual elements relative to others of the visual elements. Further, circuitry 108 can iteratively process the video stream to produce the stabilized video stream relative to the target.

In conjunction with the systems, devices, and methods described above with respect to FIGS. 1-10, circuitry is described that includes optical sensors, motion sensors, and image processing circuitry. The optical sensors are configured to capture video data of a view area, and image processing circuitry is configured to process the video data to align visual elements in adjacent frames of a sequence of frames of the video to provide a stabilized view relative to a target. In some instances, sensor data can be used to determine whether the telescopic device 100 has been shifted to change the view area of the telescopic device 100. In some instance, image processing circuitry compresses the frames as part of the alignment process.

Although the present invention has been described with reference to preferred embodiments, workers skilled in the art will recognize that changes may be made in form and detail without departing from the scope of the invention.

What is claimed is:

1. A rifle scope comprising:
a display;
at least one optical sensor to capture video of a view area;
at least one motion sensor configured to detect movement of the at least one optical sensor; and
image processing circuitry coupled to the display, the at least one motion sensor, and the at least one optical sensor, the image processing circuitry configured to:
select visual elements corresponding to static objects within a sequence of frames of a displayed portion of the video;
align the visual elements within adjacent frames of the sequence of frames by shifting the displayed portion of the video to produce a video output corresponding to the view area that is stabilized relative to a target when movement determined by the at least one motion sensor is less than a threshold movement;
when the movement is greater than the threshold movement, determine a motion vector characterizing a rate of change and direction of movement of the at least one optical sensor and selectively align corresponding visual elements from frame to frame in response to determining the motion vector to stitch adjacent view areas together to produce the video output; and
provide the video output to the display.

2. The rifle scope of claim 1, wherein the image processing circuitry comprises:
a processor; and
a memory coupled to the processor and configured to store instructions that, when executed by the processor, cause the processor to identify the visual elements within a selected video frame in the sequence of frames.

3. The rifle scope of claim 2, wherein at least some of the optical elements correspond to areas of the selected video frame that have detectable differences relative to adjacent areas of the selected video frame.

4. The rifle scope of claim 2, further comprising an interface coupled to the processor and configurable to receive instructions; and
wherein the instructions in the memory are programmable.

5. The rifle scope of claim 1, wherein the image processing circuitry is configured to generate at least one of a reticle and data for insertion into the video output.

6. The rifle scope of claim 1, wherein the image processing circuitry is configured to:
   compress the sequence of frames through one or more compression operations;
   align the visual elements within compressed ones of adjacent frames of the sequence of frames to determine alignment information; and
   refine the alignment information by realigning the visual elements within the adjacent frames of the sequence of frames to produce the video output.

7. A binocular display device comprising:
   a pair of eyepieces;
   a display that is optically accessible through the pair of eyepieces;
   at least one optical element to capture video of a view area;
   a motion sensor configured to detect movement of the at least one optical sensor; and
   image processing circuitry coupled to the display, the motion sensor, and the at least one optical element and configured to:
      provide a portion of video frames from the video to the display;
      when movement determined by the motion sensor is less than a threshold, align visual elements corresponding to static objects within sequential frames of the video and to selectively shift the portion of the video provided to the display to produce a video output that is stabilized relative to a target;
      when the movement is greater than the threshold, determine a motion vector characterizing a rate of change and direction of movement of the at least one optical element and selectively align corresponding visual elements from frame to frame to stitch adjacent view areas together to produce the video output; and
      provide the video output to the display.

8. The binocular display device of claim 7, wherein the image processing circuitry is configured to:
   compress the sequence of frames through one or more compression operations;
   align the visual elements within adjacent frames of the sequence of frames; and
   refine the alignment information by realigning the visual elements within the adjacent frames of the sequence of frames to produce the video output.

9. The binocular display device of claim 7, wherein:
   the motion sensor is configured to produce a sensor output based on movement of the at least one optical sensor; and
   wherein the image processing circuitry is configured to compare the sensor output to the threshold and, when the sensor output exceeds the threshold, to determine a motion vector from the sensor output and align the visual elements within the video frame to the motion vector.

10. The binocular display device of claim 9, wherein the at least one motion sensor comprises at least one of an inclinometer, a gyroscope, and an accelerometer.

11. The binocular display device of claim 7, wherein the image processing circuitry automatically identifies the visual elements within the video.

12. The binocular display device of claim 7, wherein the image processing circuitry comprises:
   a processor; and
   a memory coupled to the processor and configured to store instructions that, when executed, cause the processor to align the visual elements within sequential frames of the video.

13. The binocular display device of claim 12, further comprising:
   an interface configurable to receive a set of instructions; and
   wherein the processor is configured to alter or replace the instructions stored in the memory based on receiving the set of instructions.

14. A method comprising:
   receiving a video stream including a sequence of frames at a circuit of a telescopic device;
   receiving a motion signal corresponding to movement of the at least one optical sensor from a motion sensor;
   selectively shifting a displayed portion of the video stream by aligning visual elements corresponding to static objects within adjacent frames of the sequence of frames using the circuit to produce a video output that is stabilized relative to a target when the motion signal indicates a movement that is less than a threshold;
   selectively aligning corresponding visual elements from frame to frame to stitch adjacent view areas together when the movement is greater than the threshold to produce the video output; and
   providing the video output to a display of the telescopic device.

15. The method of claim 14, wherein aligning the visual elements comprises:
   automatically identifying the visual elements within the sequence of frames;
   compressing frames of the sequence of frames through one or more compression operations;
   adjusting compressed frames of the sequence of frames to determine alignment information in adjacent ones of the compressed frames;
   adjusting at least one frame of the sequence of frames based on the alignment information; and
   further adjusting the at least one frame by aligning the visual elements of the at least one frame to the visual elements of a previous frame to produce the video output.

16. The method of claim 15, wherein automatically identifying the visual elements comprises identifying groups of pixels within a frame of the sequence of frames that have a detectable difference relative to neighboring pixels within the frame.

17. The method of claim 14, further comprising:
   receiving a set of instructions at an input interface of the circuit; and
   altering instructions stored in a memory of the circuit.

18. The method of claim 14, further comprising:
   receiving motion data from one or more motion sensors at the circuit; and
   selectively aligning the visual elements in response to receiving the motion data.

19. The method of claim 18, wherein selectively aligning the visual elements comprises:
   aligning the visual elements of a first frame to corresponding visual elements of an adjacent frame in the sequence of frames when the motion data is less than the threshold; and
   aligning at least one visual element of the first frame to a motion vector derived from the motion data when the motion data exceeds the threshold.

* * * * *